(12) United States Patent
Kim

(10) Patent No.: US 10,380,111 B2
(45) Date of Patent: Aug. 13, 2019

(54) SYSTEM AND METHOD FOR SEARCHING DATA

(71) Applicant: Machbase, Inc., Seoul (KR)

(72) Inventor: Sung Jin Kim, Seoul (KR)

(73) Assignee: Machbase, Inc., Seoul (KR)

(*) Notice: Subject to any disclaimer, the term of this patent is extended or adjusted under 35 U.S.C. 154(b) by 222 days.

(21) Appl. No.: 15/682,012

(22) Filed: Aug. 21, 2017

(65) Prior Publication Data

US 2019/0057132 A1 Feb. 21, 2019

(30) Foreign Application Priority Data

Aug. 18, 2017 (KR) .......................... 10-2017-0104648

(51) Int. Cl.
*G06F 16/2453* (2019.01)
*G06F 16/22* (2019.01)
*G06F 16/245* (2019.01)

(52) U.S. Cl.
CPC .... *G06F 16/24542* (2019.01); *G06F 16/2228* (2019.01); *G06F 16/2237* (2019.01); *G06F 16/245* (2019.01); *G06F 16/24532* (2019.01)

(58) Field of Classification Search
CPC .......... G06F 16/24542; G06F 16/2237; G06F 16/24532; G06F 16/245; G06F 16/2228
USPC ...................................................... 707/718
See application file for complete search history.

(56) References Cited

U.S. PATENT DOCUMENTS

| | | | |
|---|---|---|---|
| 6,999,958 B2* | 2/2006 | Carlson | ............. G06F 16/24549 |
| 7,680,821 B2* | 3/2010 | Finlay | ................. G06F 16/2228 |
| | | | 707/803 |
| 8,447,772 B2* | 5/2013 | Carston | ............. G06F 16/24542 |
| | | | 707/759 |

(Continued)

FOREIGN PATENT DOCUMENTS

| | | |
|---|---|---|
| EP | 2940600 A1 | 11/2015 |
| KR | 10-2000-0032772 A | 6/2000 |
| KR | 10-1744892 B1 | 6/2017 |

OTHER PUBLICATIONS

Hong, Wei, et al., "Optimization of Parallel Query Execution Plans", Distributed and Parallel Databases, vol. 1, Issue 1, Jan. 1993, pp. 9-32.*

(Continued)

*Primary Examiner* — Robert Stevens
(74) *Attorney, Agent, or Firm* — Studebaker & Brackett PC

(57) ABSTRACT

The present disclosure relates to a data search system capable of providing increased speed in searching large-volume time series data in a DBMS. A data search system according to an embodiment of the invention may be implemented by a computing terminal as a system for searching data. The system may include: a query optimizer that checks whether or not a parallel scan is possible for a search target data table and generates a query execution plan; a parallel scan manager module that conducts a parallel scan on the table; and a query executer that executes the query execution plan generated by the query optimizer and, if a parallel scan is possible for the table, calls the parallel scan manager module, where the parallel scan manager module determines whether or not to execute a parallel scan by comparing the number of records forming the table with a preset value.

10 Claims, 6 Drawing Sheets

(56) References Cited

U.S. PATENT DOCUMENTS

| | | | | |
|---|---|---|---|---|
| 8,515,945 | B2* | 8/2013 | Pendap | G06F 16/24554 |
| | | | | 707/714 |
| 9,940,357 | B2* | 4/2018 | Halverson | G06F 16/24542 |
| 2008/0243768 | A1* | 10/2008 | Freedman | G06F 16/24532 |
| 2009/0094191 | A1* | 4/2009 | Chaudhuri | G06F 16/24542 |
| 2011/0320434 | A1* | 12/2011 | Carston | G06F 16/24542 |
| | | | | 707/718 |
| 2014/0310259 | A1* | 10/2014 | Tian | G06F 16/2471 |
| | | | | 707/718 |
| 2015/0154225 | A1* | 6/2015 | Fauser | G06F 16/183 |
| | | | | 707/610 |

OTHER PUBLICATIONS

Märtens, Holger, et al., "Dynamic query scheduling in parallel data warehouses", Concurrency and Computation: Practice and Experience, vol. 15, © 2003 John Wiley & Sons, Ltd., pp. 1169-1190.*
Yang, Guang, et al., "Fast Processing SPARQL Queries on Large RDF Data", DASC/PiCom/DataCom/CyberSciTech 2016, Auckland, New Zealand, Aug. 8-12, 2016, pp. 921-926.*

* cited by examiner

SYSTEM AND METHOD FOR SEARCHING DATA

CROSS-REFERENCE TO RELATED APPLICATIONS

A claim for priority under 35 U.S.C. § 119 is made to Korean Patent Application No. 10-2017-0104648 filed Aug. 18, 2017, in the Korean Intellectual Property Office, the entire contents of which are hereby incorporated by reference.

BACKGROUND

This work was supported by Seoul Metropolitan City funded by the Korean Government (CI160025)

The present invention relates to a system and method for searching data, more particularly to a data search system and method that enable increased speed in searching large-volume time series data in a DBMS (database management system).

Generally, a time series DBMS employs techniques such as compressing data and applying indexes in real time to a bitmap for high-speed input and real-time indexing. A DBMS may also perform operations such as, among others, index-based browsing, data decompression, and search target conditional clause checking, for searches of large-volume data.

Also, if several disks are used (e.g. RAID) or if a high-speed permanent storage device is used (e.g. SSD) in operating a DBMS, the speed of the input and output to and from the disk is increased. Such increase in speed increases the operation efficiency of reading compressed data, and consequently, the CPU processing loads associated decompression and search target condition checks are increased as compared to the read speed for the disk. That is, the time expended in processing the data search may become greater than the time for reading and writing from and to the disk.

Also, the process of searching large-volume time series data in a real-time time series DBMS may typically use a sequential data access method or an indexed search based on bitmap indexing. Here, time series data inherently entails frequent occurrences of repeated data, and an indexing method based on unique keys would result in low search efficiency and incur a limit on the performance of the overall system when searching large-volume time series data.

Indexing methods based on bitmaps may be used to resolve the problem above. A bitmap-based indexing method can generate indexes very quickly, enabling quick maintenance of indexes for data inputted at high speeds albeit with slow updates, but since time series data does not perform update operations, such method can be applied to time series data at a preliminary level.

Even when such method is applied, however, it may not produce particularly useful results in cases where the amount of data actually inputted is very large or in cases where the number of search target records is very great. Another example known in the related art is the search method based on the B+ tree for an RDBMS, but this method is only efficient when there is only one search target record or when there is small amount of data and is inevitably highly inefficient for time series data having large amounts of repeated keys.

Also, a real-time compression technique may be used in order to store real-time data on a disk despite limited disk output speed, and a decompressing of the compressed data may be required for transmitting the search results. In this case, a high-speed transmission of data is possible with smaller amounts of disk space and data transmission speed as compared to original data, but an additional operation for decompression may have to be performed. That is, due to recent improvements in hardware performance, a bottleneck occurs not during disk reading operations but rather during operations such as decompressing or performing conditional clauses after the reading.

Existing technology is limited in searching large-volume real-time time series data. In particular, whereas improvements in search performance are also needed in step with the improvements in disk performance, there are no solutions being offered. Thus, there is a need for technological developments for effectively resolving the problems discussed above.

SUMMARY

An objective of the invention is to provide improved search speed within a DBMS for large-volume time series data.

Another objective of the invention is to provide a solution with which record searches can be conducted concurrently without reading repeated records by using bitmap indexes.

A data search system according to an embodiment of the invention may be a system that is implemented by way of a computing terminal as a system for searching data. The data search system may include: a query optimizer configured to check whether or not a parallel scan is possible for a search target data table and generate a query execution plan; a parallel scan manager module configured to conduct a parallel scan on the table; and a query executer configured to execute the query execution plan generated by the query optimizer and, if a parallel scan is possible for the table, call the parallel scan manager module, where the parallel scan manager module may determine whether or not to execute a parallel scan by comparing the number of records forming the table with a preset value.

Also, the query optimizer may determine that a parallel scan is possible if the search target table does not include an inner table of a nested loop join type and includes time series data.

Also, the parallel scan manager module may execute the parallel scan if the number of records forming the table is greater than or equal to a preset value.

Also, the parallel scan manager module may divide the record identifiers (RID) into one or more RID ranges and may generate parallel scan threads in a number corresponding to the number of the divided RID ranges, where the record identifiers may be evenly allotted in number to the respective RID ranges.

Also, the system may further include one or more index scan module and data file module for performing the parallel scan threads respectively, where each of the index scan modules may include bitmap indexes that are composed of bit values for the RID included in the respective RID ranges.

Also, a terminal node in the bitmap index may include a key value and a bitmap, the bitmap may include a bit value of 1 if a record having a particular key value is present in the corresponding position and a bit value of 0 if the record is not present in the corresponding position, and each of the index scan modules may obtain record information without repetition according to bitmap values of the respective RID ranges having the same key value.

Also, each of the index scan modules may generate bitmap indexes by determining whether or not an index required for a search is present, generating a bit mask of a range for reading according to the respective evenly allotted RID range if the index is present, and performing an AND logic operation on the bit mask and a bitmap of the index.

Also, each of the data file modules may read the records included in each RID range based on the record information obtained by the respective index scan module and may transfer the records to a particular execution module.

A method for searching data according to an embodiment of the invention may be implemented by way of a computing terminal and may include: checking whether or not a search target data table is a table for which a parallel scan is possible that does not include an inner table of a nested loop join type and includes time series data and generating a query execution plan; executing a parallel scan if the generated query execution plan is a plan using a parallel scan and if the number of records forming the search target table is greater than or equal to a preset value; dividing the identifiers of the records (RID) into one or more RID ranges and generating parallel scan threads, where the number of parallel scan threads corresponds to the number of divided RID ranges, and the record identifiers are evenly allotted in number to the respective RID ranges; obtaining record information without repetition according to the bitmap values of each of the RID ranges having a same key value, by way of bitmap indexes formed of bit values for the RID included in each of the RID ranges; and reading the records included in each of the RID ranges based on the obtained record information and transferring the records to a particular execution module.

Also, the bitmap indexes may be generated by determining whether or not an index required for a search is present, generating a bit mask of a range for reading according to the respective evenly allotted RID range if the index is present, and performing an AND logic operation on the bit mask and a bitmap of the index.

An aspect of the invention makes it possible to achieve improved search speed in searching large-volume time series data.

Also, searches of many records can be conducted concurrently without having repeated records, by utilizing bitmap indexes.

Additional aspects and advantages of the present invention will be set forth in part in the description which follows, and in part will be obvious from the description, or may be learned by practice of the invention.

DETAILED DESCRIPTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

Figure 1:
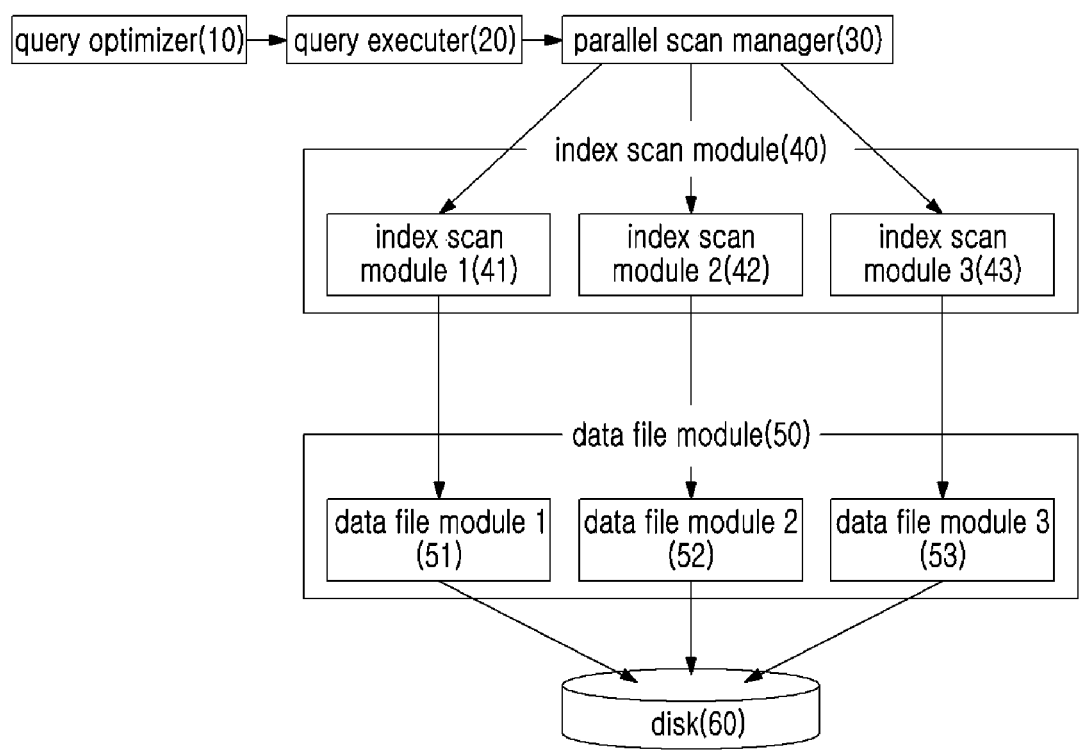
FIG. 1 is a block diagram illustrating the composition of a data search system according to an embodiment of the invention.

First, a description is provided below, with reference to FIG. 1, of the composition of a data search system according to an embodiment of the invention. FIG. 1 is a block diagram illustrating the composition of a data search system according to an embodiment of the invention.

Basically, a data search system according to an embodiment of the invention relates to a system that is implemented by a computing terminal and is configured for searching data.

As illustrated in FIG. 1, a data search system according to an embodiment of the invention may include a query optimizer 10, a query executer 20, a parallel scan manager module 30, index scan modules 40, data file modules 50, and a disk 60.

The query optimizer 10 may receive a query parse tree. Here, a query parse tree refers to a query inputted by a user of the system after the query has passed through query parser and query legitimacy check processing.

Based on the received query parse tree, the query optimizer 10 may check whether or not the corresponding search target data has a table for which a parallel scan is possible and may generate a query execution plan.

More specifically, the query optimizer 10 may determine that a parallel scan is possible for a search target table if the search target table does not include an inner table of a nested loop join type and includes time series data. That is, the query optimizer 10 may generate a query execution plan that utilizes a parallel scan, unless the search target table is a nested loop join type inner table or does not store time series data.

The query executer 20 may execute the query execution plan generated by the query optimizer 10, and in cases where a parallel scan is possible for the table, may call the parallel scan manager module 30.

The parallel scan manager module 30 may perform a parallel scan on the table, where the parallel scan manager module 30 may determine whether or not to execute a parallel scan by comparing the number of records forming the table with a preset value. To be more specific, the parallel scan manager module 30 may execute a parallel scan if the number of records forming the table is equal to or greater than the preset value. That is, the parallel scan manager module 30 may not conduct a parallel scan if the number of target records is smaller than a particular value set beforehand (the preset value). A reason for this is because the added cost from generating threads, etc., is relatively large for a small number of records. Here, the size of the preset value can be determined differently according to the user's selection or according to data type. It can be said that the preset value can be determined based on whether or not the number of records is such that warrants a parallel scan, considering the properties of the data serving as the search target.

In other words, the parallel scan manager module 30 may receive the range of record identifiers of the search target table, determine whether or not to actually conduct a parallel table scan, and calculate the range that is to be covered by each individual scan.

Also, the parallel scan manager module 30 may divide the range of the records' identifiers (RID) into one or more RID ranges and may generate parallel scan threads tantamount to the divided number, where the numbers of record identifiers are evenly allotted to the respective RID ranges.

Here, a record identifier (RID) may be a unique value in the same table in which the record is inputted within a time series DBMS and may be a single value that is incremented by 1 every time a record is additionally inputted.

That is, the parallel scan manager module 30 may generate parallel scan threads for conducting a parallel scan and may generate data buffer queues for recording by the parallel scan threads. Each parallel scan thread may receive the RID's that are to be processed, in the form of a range, as input. Also, the parallel scan manager module 30 may generate the parallel scan threads such that the identifier ranges are evenly assigned.

A data search system according to an embodiment of the invention can further include one or more index scan modules 40 and data file modules 50 for performing each of the parallel scan threads. FIG. 1 illustrates an example in which there are three threads generated and three index scan modules 40 and data file modules 50 (41, 42, 43, 51, 52, 53), respectively. Here, the number of threads can be varied, and the number of index scan modules 40 and data file modules 50 can also be varied accordingly.

More specifically, a first index scan module 41 and a first data file module 51 can be provided for one parallel scan thread (first thread), a second index scan module 42 and a second data file module 52 can be provided for another parallel scan thread (second thread), and a third index scan module 43 and a third data file module 53 can be provided for still another parallel scan thread (third thread).

The index scan modules 40 may be called only when a search using indexes is performed, and as the index scan modules 40 return RID bitmaps, the data file modules 50 may read the records having these RID's from the disk, check the non-index search conditions, and record the records that satisfy the conditions in thread buffers. These procedures may be repeated until the thread buffers are full, to transfer the data of the buffer to the parallel scan manager module 30.

The disk 60 corresponds to the location to which the data file module 50 transfers the records read by the individual data file modules 51, 52, 53 after the data file modules 51, 52, 53 read the records included in the respective RID ranges based on the record information obtained by the respective index scan modules 41, 42, 43. More specifically, the information on the disk 60 can be transferred to a higher-level module.

Next, a description is provided below, with reference to FIG. 2, of a process by which the index scan module of a data search system according to an embodiment of the invention obtains records within the desired range without having repeated record identifiers for the same key value.

Figure 2:
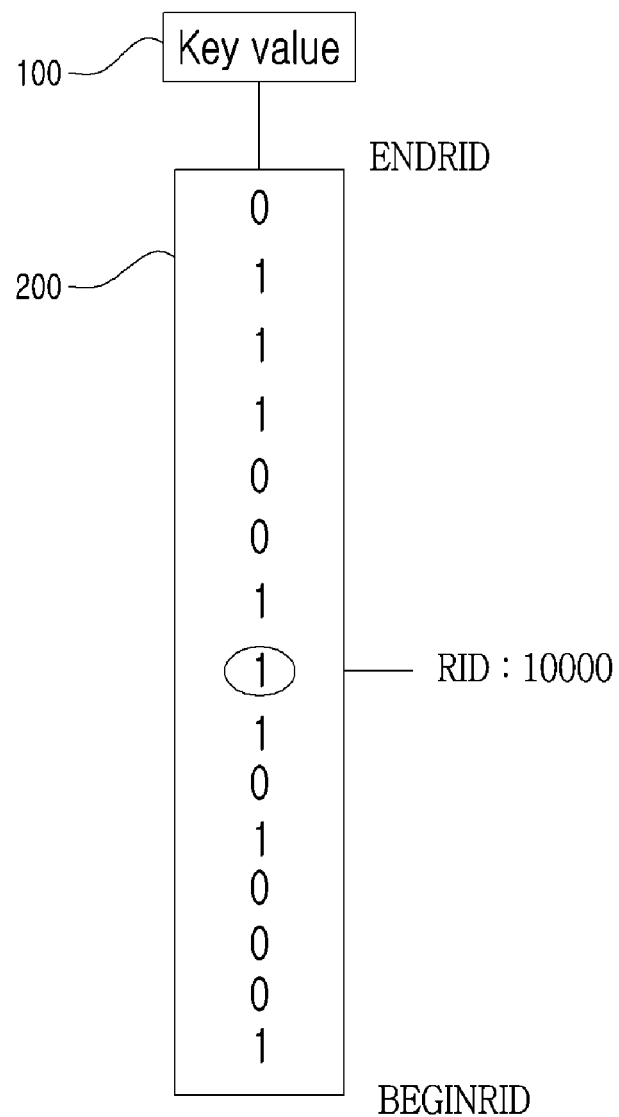
FIG. 2 illustrates a process by which the index scan module of a data search system according to an embodiment of the invention obtains records within the desired range without having repeated record identifiers for the same key value.

FIG. 2 illustrates a process by which the index scan module of a data search system according to an embodiment of the invention obtains records within the desired range without having repeated record identifiers for the same key value.

In the process illustrated FIG. 2, each of the index scan modules 40 may include bitmap indexes formed by bit values for the RID's included in the respective RID range. In the bitmap indexes, a terminal node may include a key value and a bitmap, where the bitmap may have a bit value of 1 if a record having a particular key value is present in the corresponding position and a bit value of 0 if such a record is not present in the corresponding position. Also, each of the index scan modules 40 may obtain record information without repetition according to the bitmap values of each RID range having the same key value.

To be more specific, the method illustrated in FIG. 2 by which an index scan module 40 obtains records in a desired range without repetition of the record identifiers for the same key value 100 may proceed as follows.

First, in the bitmap index, a terminal node may be composed of a <key value, bitmap> pair. The method of obtaining an RID set having a particular key from the key value-bitmap pairs of the bitmap index may proceed as follows. A bitmap 200 may have a value of 1 if a record having the particular key value is present at a position and may have a value of 0 if such record is not present at the position. If one bitmap does not represent the entire table and has a divided portion, the bitmap may include BEGINRID and ENDRID. Here, to ascertain whether or not a particular RID has a desired key value, the difference between BEGINRID and the corresponding RID may be obtained, and the bit value at the position further by said difference within the bitmap may be checked.

If the bit value of the corresponding RID is 1, then said RID is a record having the key, and if the bit value is 0, it is a record that does not have the key. In FIG. 2, the record having the RID of 10000 has a bit value of 1 at the corresponding position, and thus is a record having the desired key value.

Through the process above, a data search system according to an embodiment of the invention can obtain records within a desired range without repetition of record identifiers for the same key value, by utilizing the index scan module.

Next, a description is provided below, with reference to FIG. 3, of a parallel scanning process in a data search system according to an embodiment of the invention.

Figure 3:
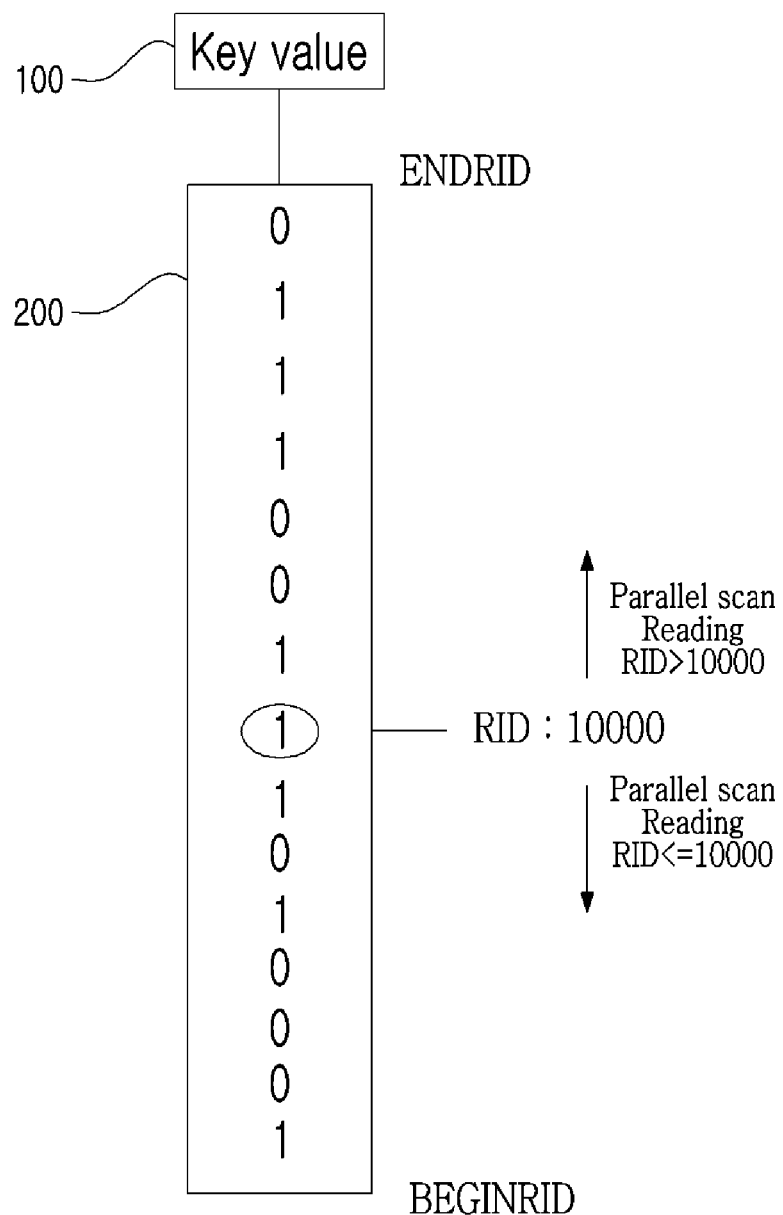
FIG. 3 illustrates a parallel scanning process in a data search system according to an embodiment of the invention.

FIG. 3 illustrates a parallel scanning process in a data search system according to an embodiment of the invention.

With a parallel scan for a data search system according to an embodiment of the invention, a search may be performed by generating a parallel scan for the overall table data using RID-based parameters, as illustrated in FIG. 3. Here, the parallel scan can be performed with the range of the search target record identifiers set by input values during generation.

As illustrated in FIG. 3, a parallel scan for a range of RID's of 10000 or below and a parallel scan for a range of RID's of over 10000 can be operated concurrently.

In this state, the index scan module 40 may perform a process for obtaining records within the desired range without repetition of record identifiers for the same key value. This process is described below with reference to FIG. 4.

Figure 4:
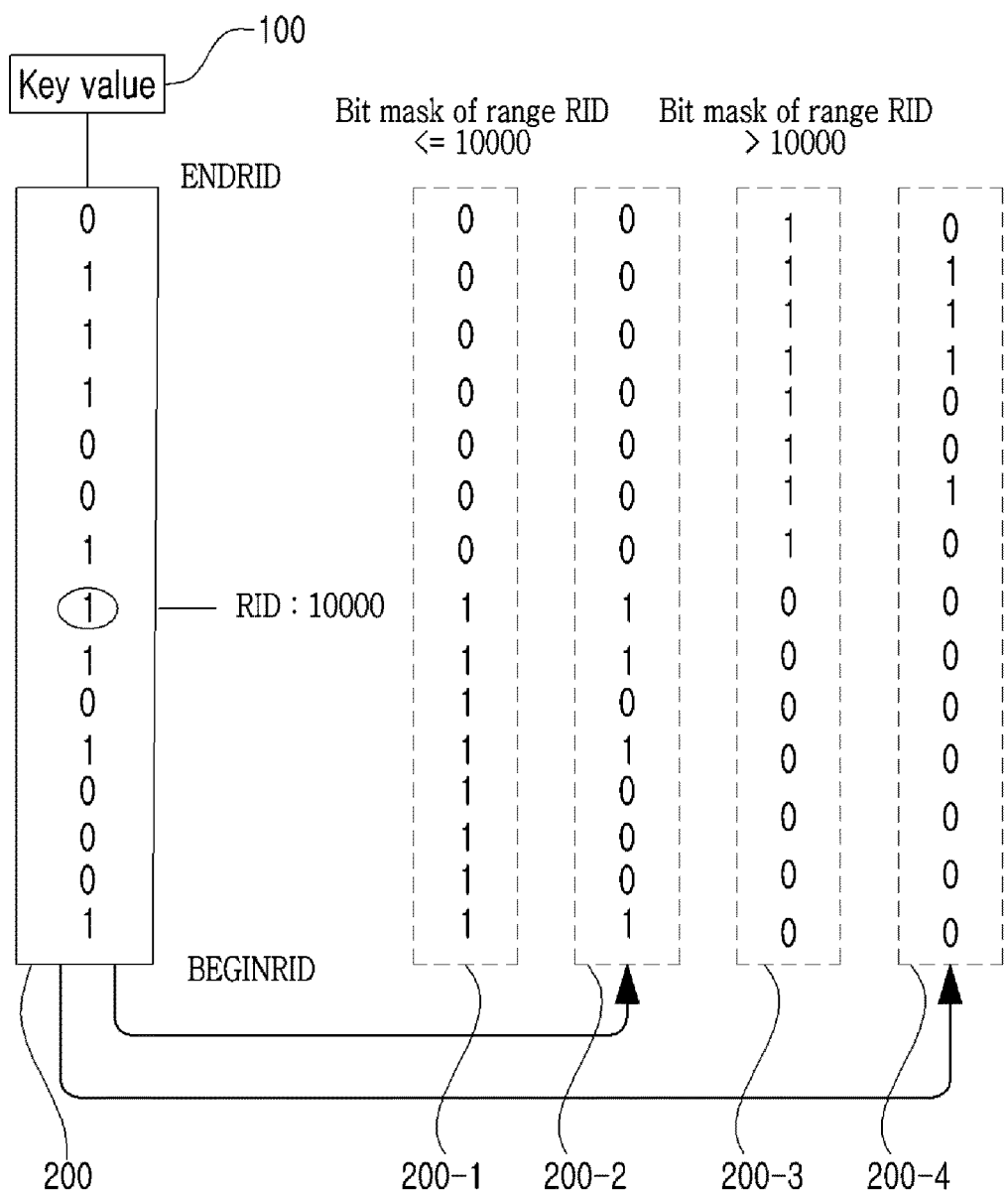
FIG. 4 illustrates the process of generating bit masks during a parallel scanning process by a data search system according to an embodiment of the invention.

FIG. 4 illustrates the process of generating bit masks during a parallel scanning process by a data search system according to an embodiment of the invention.

As illustrated in FIG. 4, the index scan module 40 may generate bit masks 200-1, 200-3 of ranges for reading, according to the RID ranges of the divided parallel scans, and may perform AND logic operations on the bit masks and the bitmap 200 of the terminal node of the index. The resulting bitmaps 200-2, 200-4 correspond to the index results required for the parallel scans.

Here, the index scan module 40 may determine whether or not an index required for the search is present, before generating the bit masks. If the determining shows that an index required for the search is present, then the bit masks for the RID ranges may be generated.

Figure 5:
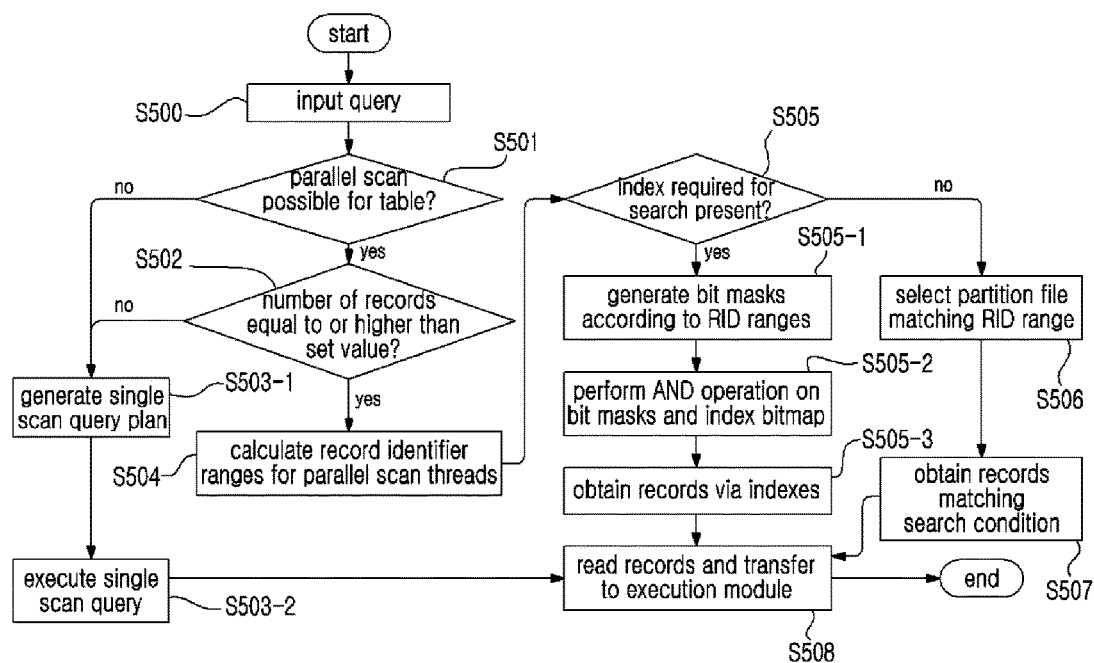
FIG. 5 is a flowchart illustrating a data search method according to an embodiment of the invention.
Figure 6:
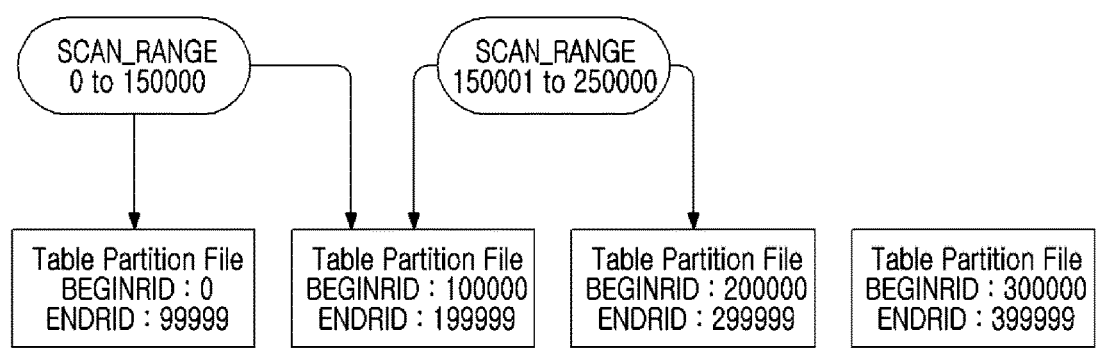
FIG. 6 illustrates the processing procedures in cases where a search condition of a query cannot use indexes in a data search method according to an embodiment of the invention.

Lastly, a description is provided below, with reference to FIG. 5 and FIG. 6, of a method of searching data according to an embodiment of the invention. FIG. 5 is a flowchart illustrating a data search method according to an embodiment of the invention, and FIG. 6 illustrates the processing procedures in cases where a search condition of a query cannot use indexes in a data search method according to an embodiment of the invention.

As illustrated in FIG. 5, a data search method according to an embodiment of the invention may receive a query input (S500) and, according to the query, may check whether or not the corresponding data table is a table for which a parallel scan is possible (S501). More specifically, the search target table is checked whether or not it is a parallel-scannable table, which does not include a nested loop join type inner table and includes time series data. If the search target table is a table for which a parallel scan is possible, then it is determined whether or not the number of records is greater than or equal to a set value (S502). If the search target table is not a table for which a parallel scan is possible, then a single scan query plan may be generated (S503-1), and a single scan query may be executed accordingly (S503-2). Afterwards, the records may be read by way of the single scan query execution and transferred to the execution module (S508). Similarly, in cases where the number of records is below the set value also, a single scan query plan may be generated (S503-1), and a single scan query may be executed accordingly (S503-2), after which the records may be transferred to the execution module (S508).

If the number of records is greater than or equal to the set value, the record identifier ranges for the parallel scan threads may be calculated (S504). Also, it may be determined whether or not an index required for the search is present in the calculated record identifier (RID) ranges (S505). If an index is present, then bit masks may be generated according to the RID ranges (S505-1). Also, AND computations may be performed on the bit masks and the index bitmap (S505-2). After the operation, the records may be obtained by way of the indexes (S505-3). Then, the corresponding records may be read and transferred to the execution module (S508).

If the index required for the search is not present in the calculated record identifier range, a partition file may be selected that matches the RID range (S506). Accordingly, the records satisfying the search conditions may be obtained (S507), and the obtained records may be read and transferred to the execution module (S508).

A more detailed description is provided below, with reference to FIG. 6, of the case in which the index required for the search is not present.

As illustrated in FIG. 6, if the query search condition cannot utilize indexes, the processing can adopt the following procedures.

First, the data file of the time series DBMS may be stored partitioned according to object identifiers. Each partition file may have a <BEGINRID, ENDRID> pair for the records stored in the file, where the record identifiers (RID) are characterized in that they are always incremented without repetition. Thus, if the range of RID's is known, the data file for the range can be determined. Accordingly, the data file scan thread may conduct a search operation for only the data file corresponding to the designated RID range.

FIG. 6 illustrates an example in which two parallel scans for which the RID ranges are <0, 150000> and <150001, 250000> conduct a search. In cases where only a portion of an RID range is relevant during the data search, as seen in FIG. 6, the corresponding scan thread may not perform the search for data outside the RID range.

With the system and method for searching data according to certain embodiments of the present invention set forth above, the search speed can be increased in searching large-volume time series data, and even when bitmap indexes are used to search records concurrently, the search can avoid reading repeated records thereby maximizing search efficiency.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on said operating system. Also, the processing device can access, store, manipulate, process, and generate data in response to an execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

What is claimed is:

1. A system for searching data, the system implemented by way of a computing terminal, the system comprising:
   a query optimizer configured to check whether or not a parallel scan is possible for a search target data table and generate a query execution plan;
   a parallel scan manager module configured to conduct a parallel scan on the table; and
   a query executer configured to execute the query execution plan generated by the query optimizer, the query executer configured to call the parallel scan manager module if a parallel scan is possible for the table,
   wherein the parallel scan manager module determines whether or not to execute a parallel scan by comparing a number of records forming the table with a preset value.

2. The system for searching data according to claim 1, wherein the query optimizer determines that a parallel scan is possible if the search target table does not include an inner table of a nested loop join type and includes time series data.

3. The system for searching data according to claim 2, wherein the parallel scan manager module executes the parallel scan if a number of records forming the table is greater than or equal to a preset value.

4. The system for searching data according to claim 3, wherein the parallel scan manager module divides identifiers of the records (RID) into one or more RID ranges and generates parallel scan threads, a number of the parallel scan threads corresponding to a number of the divided RID ranges, and wherein the record identifiers are evenly allotted in number to the respective RID ranges.

5. The system for searching data according to claim 4, further comprising:
   one or more index scan module and data file module for performing the parallel scan threads respectively,
   wherein each of the index scan modules includes bitmap indexes composed of bit values for the RID included in the respective RID ranges.

6. The system for searching data according to claim 5, wherein a terminal node in the bitmap index comprises a key value and a bitmap,
   the bitmap includes a bit value of 1 if a record having a particular key value is present in a corresponding position and a bit value of 0 if the record is not present in the corresponding position, and
   each of the index scan modules obtains record information without repetition according to bitmap values of the respective RID ranges having same key value.

7. The system for searching data according to claim 6, wherein each of the index scan modules generates bitmap indexes by determining whether or not an index required for a search is present, generating a bit mask of a range for reading according to the respective evenly allotted RID range if the index is present, and performing an AND logic operation on the bit mask and a bitmap of the index.

8. The system for searching data according to claim 7, wherein each of the data file modules reads records included in each RID range based on record information obtained by the respective index scan module and transfers the records to a particular execution module.

9. A method for searching data, the method implemented by way of a computing terminal, the method comprising:
   checking whether or not a search target data table is a table for which a parallel scan is possible and which does not include an inner table of a nested loop join type and includes time series data and generating a query execution plan;
   executing a parallel scan if the generated query execution plan is a plan using a parallel scan and if a number of records forming the search target table is greater than or equal to a preset value;
   dividing identifiers of the records (RID) into one or more RID ranges and generating parallel scan threads, a number of the parallel scan threads corresponding to a number of the divided RID ranges, the record identifiers evenly allotted in number to the respective RID ranges;
   obtaining record information without repetition according to bitmap values of each of the RID ranges having a same key value, by way of bitmap indexes formed of bit values for the RID included in each of the RID ranges; and
   reading records included in each of the RID ranges based on the obtained record information and transferring the records to a particular execution module.

10. The method for searching data according to claim 9, wherein the bitmap indexes are generated by determining whether or not an index required for a search is present, generating a bit mask of a range for reading according to the respective evenly allotted RID range if the index is present, and performing an AND logic operation on the bit mask and a bitmap of the index.

* * * * *